(12) United States Patent
Muthuswamy et al.

(10) Patent No.: US 12,182,852 B2
(45) Date of Patent: Dec. 31, 2024

(54) CONTACTLESS REMOTE SHOPPING ASSISTANCE

(71) Applicant: International Business Machines Corporation, Armonk, NY (US)

(72) Inventors: Srinivasan S. Muthuswamy, Bangalore (IN); Negandhi Vrunda Ravindra, Sangli (IN); Manish Anand Bhide, Hyderabad (IN); Subhendu Das, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 17/503,487

(22) Filed: Oct. 18, 2021

(65) Prior Publication Data
US 2023/0124205 A1    Apr. 20, 2023

(51) Int. Cl.
*G06Q 30/0601* (2023.01)
*B25J 9/16* (2006.01)
(Continued)

(52) U.S. Cl.
CPC .......... *G06Q 30/0635* (2013.01); *B25J 9/162* (2013.01); *B65G 1/1373* (2013.01);
(Continued)

(58) Field of Classification Search
CPC ............ G06Q 30/0635; G06Q 10/083; G06Q 10/0875; G06Q 30/0633; G06Q 30/0641; B65G 1/1373; G05B 15/02; H04N 7/18
See application file for complete search history.

(56) References Cited

U.S. PATENT DOCUMENTS 5,918,213 A * 6/1999 Bernard .............. G06Q 30/0609
709/227
9,171,281 B1 * 10/2015 Francis .............. G06Q 30/0635
(Continued)

FOREIGN PATENT DOCUMENTS

CN         103448761 A    5/2012
CN         104787102 B    9/2017
(Continued)

OTHER PUBLICATIONS

"In-Store Navigation with IoT-enabled Devices for retail stores", eInfochips (An Arrow Company), Oct. 11, 2018, 2 pages, <https://medium.com/@einfochips/in-store-navigation-with-iot-enabled-devices-for-retail-stores-ebe0416dcc92>.
(Continued)

*Primary Examiner* — Thomas Randazzo
(74) *Attorney, Agent, or Firm* — Shackelford, McKinley & Norton, LLP

(57) ABSTRACT

In an approach to facilitate contactless remote shopping assistance, a computer-implemented method includes one or more processors configured for receiving first order data from a user device corresponding to an order of items to be retrieved from a parking lot of a retail entity proximate to a retail entity location, transmitting the first order data to the retail entity, and assigning the order to a mobility device stationed at the retail entity. The method further includes transmitting order retrieval instructions to the mobility device causing the mobility device to navigate the retail to secure the items, receiving an indication that the mobility device secured the items, and transmitting order delivery instructions to the mobility device. The method further includes receiving a second indication that the mobility device transported the items to the parking lot and placed the items in a vehicle associated with a user of the user device.

20 Claims, 6 Drawing Sheets

(51) Int. Cl.
*B65G 1/137* (2006.01)
*G05B 15/02* (2006.01)
*G06Q 10/083* (2024.01)
*G06Q 10/087* (2023.01)
*G06Q 10/0875* (2023.01)
*H04N 7/18* (2006.01)

(52) U.S. Cl.
CPC ........... *G05B 15/02* (2013.01); *G06Q 10/083* (2013.01); *G06Q 10/087* (2013.01); *G06Q 10/0875* (2013.01); *H04N 7/18* (2013.01)

(56) References Cited

U.S. PATENT DOCUMENTS

| | | | |
|---|---|---|---|
| 9,519,882 | B2 | 12/2016 | Galluzzo |
| 9,896,315 | B2* | 2/2018 | High ................... G06Q 30/0641 |
| 11,699,114 | B2* | 7/2023 | Roth ................ G06Q 10/06311 |
| | | | 705/7.13 |
| 2007/0187183 | A1* | 8/2007 | Saigh ....................... E04H 14/00 |
| | | | 186/53 |
| 2011/0208613 | A1 | 8/2011 | Parham |
| 2014/0052498 | A1* | 2/2014 | Marshall ............... G07F 9/0235 |
| | | | 700/218 |
| 2016/0148300 | A1* | 5/2016 | Carr ................... G06Q 30/0633 |
| | | | 705/26.8 |
| 2018/0341908 | A1 | 11/2018 | Lert, Jr. |
| 2019/0118844 | A1 | 4/2019 | Li |
| 2019/0344965 | A1* | 11/2019 | Wilkinson .............. G07F 11/42 |
| 2022/0164767 | A1* | 5/2022 | Hiroto ..................... G07F 17/12 |
| 2022/0270027 | A1* | 8/2022 | Woods .................. G06F 16/444 |

FOREIGN PATENT DOCUMENTS

| | | |
|---|---|---|
| CN | 110751799 A | 2/2020 |
| JP | 2018533535 A | 11/2018 |
| KR | 20180037150 A | 4/2018 |
| WO | 2019242694 A1 | 12/2019 |

OTHER PUBLICATIONS

"May the shopping be with you: French supermarket tests robot delivery", ET Retail.com, Apr. 19, 2019, 8 pages, <https://retail.economictimes.indiatimes.com/news/industry/may-the-shopping-be-with-you-french-supermarket-tests-robot-delivery/68949102>.

Guizzo, Erico, "Robot Vehicles Make Contactless Deliveries Amid Coronavirus Quarantine", IEEE Spectrum, Apr. 2, 2020, 5 pages, <https://spectrum.ieee.org/automaton/transportation/self-driving/robot-vehicles-make-contactless-deliveries-amid-coronavirus-quarantine>.

Korosec, Kirsten, "Starship Technologies is sending its autonomous robots to more cities as demand for contactless delivery rises", Tech Crunch, Apr. 9, 2020, 7 pages, <https://techcrunch.com/2020/04/09/starship-technologies-is-sending-its-autonomous-robots-to-more-cities-as-demand-for-contactless-delivery-rises/>.

Mell et al., "The NIST Definition of Cloud Computing", National Institute of Standards and Technology, Special Publication 800-145, Sep. 2011, 7 pages.

\* cited by examiner

CONTACTLESS REMOTE SHOPPING ASSISTANCE

BACKGROUND

The present invention relates generally to the field of assistive shopping devices and programs, and more particularly to contactless remote shopping with autonomous cart assistance.

Worldwide health crises and pandemics disrupt life's normal routines and lead to government agencies and corporate entities limiting, and even preventing, social activities. Social activities, such as shopping or working in retail stores, are mostly affected by health and safety precaution closures in the retail industry. Shoppers utilize a variety of different shopping methods, including for some, visiting a store in-person, and for others, use of a shopping software application to create a list and place an order. Online shopping applications allow their users to shop online or remotely.

SUMMARY

Embodiments of the present invention disclose computer-implemented methods, computer program products, and computer systems for contactless remote shopping assistance. The computer-implemented method includes one or more processors configured for receiving first order data from a user device corresponding to an order of one or more items to be retrieved from a parking lot of a retail entity proximate to a retail entity location, transmitting the first order data to the retail entity, and assigning the order to a mobility device stationed at the retail entity. The computer-implemented method further includes transmitting order retrieval instructions to the mobility device causing the mobility device to navigate the retail to secure the items. Further, the computer-implemented method may include one or more processors configured for receiving an indication that the mobility device secured the one or more items and transmitting order delivery instructions to the mobility device. The computer-implemented method further includes one or more processors configured for receiving a second indication that the mobility device transported the one or more items to the parking lot and placed the one or more items in a vehicle associated with a user of the user device.

DETAILED DESCRIPTION

Figure 1:
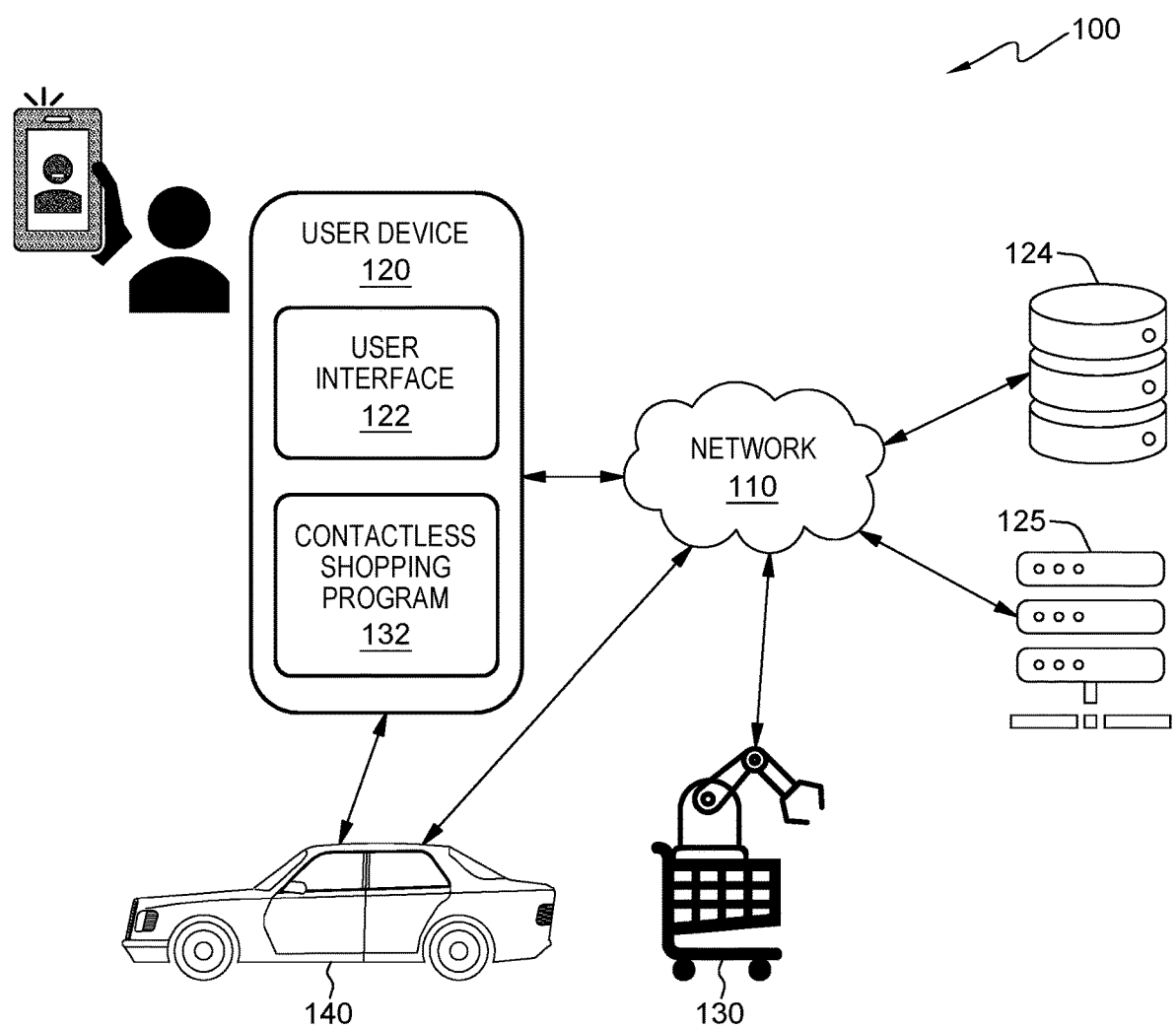
FIG. 1 is a functional block diagram illustrating a distributed data processing environment, in accordance with an embodiment of the present invention.

Embodiments of the present invention recognize that shoppers are realizing a greater need for mobility and assisted living, especially during global pandemics when staying at home decrease chances of contracting a disease. Many shoppers may still have to enter a physical store to retrieve their purchased items. Further, some shopping applications do not allow shoppers to view items in the store or make modifications to their order while it is being fulfilled. Countless personalized shopping services, home delivery services, and touchless shopping services have emerged during the COVID-19 pandemic to facilitate consumer safety while maintaining some semblance of normalcy throughout the global economy. Public health organizations and other government agencies have urged shoppers to stay at home unless necessary and recommend safety precautions while navigating our cities and towns in public spaces. Shoppers are encouraged to socially distance and wash and/or sanitize hands and surfaces often to avoid touching surfaces that may have been infected with a communicable disease.

Embodiments of the present invention recognize that shoppers would benefit from a contactless remote shopping assistive program that receives orders, processes orders, causes a mobility device to retrieve order items, and delivers the items to a user vehicle in a parking lot nearby, all while allowing the user to avoid personal contact with items or surfaces in the shopping facility. In some embodiments, order update requests may be received from the user and provided to the mobility device while the mobility device is retrieving the items. Other embodiments of the present invention are configured to provide a livestream video of the mobility device's view of retrieving the items to the user, wherein the order update request may include annotated images captured from the livestream video.

Embodiments of the present invention recognize that a user may want some assurance that the mobility device will deliver the purchased items to the correct vehicle, wherein the assurance may include transmitting images of the intended pick-up vehicle to the user to receive user confirmation that the intended pick-up vehicle is the correct vehicle.

Embodiments of the present invention recognize that the mobility device may be configured to be remotely operated by a human operator. For example, the mobility device may receive instructions to navigate a shopping facility, retrieve or return items from a shelf or display in the shopping facility, wherein the instructions may be received from a shopper user or from an agent user of the retail entity in which the user shopper is requesting shopping assistance.

Embodiments of the present invention also recognize that a shopper user may provide cash as payment for the items to the mobility device. Therefore, the mobility device may be configured to accept cash payments and provide change to a shopper user in conjunction with delivering the items to the user vehicle.

The present invention will now be described in detail with reference to the Figures.

FIG. 1 is a functional block diagram illustrating a data processing environment, generally designated 100, in accordance with one embodiment of the present invention. In an embodiment, data processing environment 100 may be a distributed data processing environment. The term "distributed" can describe a computer system that includes multiple, physically distinct devices that operate together as a single computer system. FIG. 1 provides only an illustration of one implementation and does not imply any limitations with regard to the environments in which different embodiments may be made by those skilled in the art without departing from the scope of the invention as recited by the claims.

Data processing environment 100 includes user device 120, mobility device 130, and user vehicle 140, interconnected via network 110. Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between user device 120, mobility device 130, and user vehicle 140, and other computing devices (not shown) within data processing environment 100.

User device 120 can be a standalone computing device, a management server, a web server, a mobile computing device, or any other electronic device or computing system capable of receiving, sending, and processing data. In other embodiments, user device 120 can represent a server computing system utilizing multiple computers as a server system, such as in a cloud computing environment. In another embodiment, user device 120 can be a laptop computer, a tablet computer, a netbook computer, a personal computer (PC), a desktop computer, a personal digital assistant (PDA), a smart phone, or any programmable electronic device capable of communicating with mobility device 130, user vehicle 140, and other computing devices (not shown) within data processing environment 100 via network 110. In another embodiment, user device 120 represents a computing system utilizing clustered computers and components (e.g., database server computers, application server computers, etc.) that act as a single pool of seamless resources when accessed within data processing environment 100. User device 120 may include internal and external hardware components, as depicted, and described in further detail with respect to FIG. 4.

In various embodiments of the present invention, mobility device 130 can be one of an autonomous robotic shopping cart, a smart shopping cart, or any programmable electronic device capable of communicating with various components and devices within data processing environment 100, via network 110. In general, mobility device 130 represents any programmable electronic device or combination of programmable electronic devices capable of executing machine readable program instructions and communicating with other computing devices (not shown) within data processing environment 100 via a network, such as network 110. Further, mobility device 130 represents any programmable electronic device capable of executing machine readable program instructions to navigate an area, retrieve and return items within the area. Mobility device 130 may include internal and external hardware components, as depicted, and described in further detail with respect to FIG. 4.

In some embodiments, user device 120 may include user interface 122 to operate as a local user interface on user device 120. In some embodiments, user interface 122 is a local app interface of a program (e.g., software configured to execute the steps of the invention described herein) on user device 120, mobility device, or user vehicle 140. In some embodiments, user interface 122 is a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from the program via network 110. In an embodiment, user interface 122 enables a user to send and receive data (i.e., to and from the program via network 110, respectively).

Database 124 may operate as a repository for data associated with server 125, user device 120, mobility device 130, user vehicle 140, and other data transmitted within network 110. A database is an organized collection of data. For example, order data may include data corresponding with an order placed on user device 120, mobility device 130, or user vehicle 140. Further, order data may include data associated with a user of user device 120, mobility device 130, or user vehicle 140. Order data may include data corresponding to user information, customer information, store information, order information, payment information, delivery information, or any other information associated with or gathered in the process of a user placing an order within the scope of the embodiments described herein.

Database 124 can also be implemented with any type of storage device capable of storing data and configuration files that can be accessed and utilized by either of user device 120, mobility device 130, or user vehicle 140, such as a database server, a hard disk drive, or a flash memory. In an embodiment, database 124 may be accessed by user device 120, mobility device 130, or user vehicle 140 to store data associated with user device 120, mobility device 130, or user vehicle 140. In another embodiment, database 124 may be accessed by user device 120, mobility device 130, or user vehicle 140 to access data as described herein. In an embodiment, database 124 may reside independent of network 110. In another embodiment, database 124 may reside elsewhere within distributed data processing environment 100 provided database 124 has access to network 110.

In the depicted embodiment, server(s) 125 may contain a program (e.g., software configured to execute the steps of the invention described herein, contactless shopping program 132) and database 124. In some embodiments, server(s) 125 can be a standalone computing device(s), a management server(s), a web server(s), a mobile computing device(s), or any other electronic device(s) or computing system(s) capable of receiving, sending, and processing data. In some embodiments, server 125 may be a laptop computer, tablet computer, netbook computer, personal computer (PC), a desktop computer, a smart phone, or any programmable electronic device capable of communicating with user device 120, mobility device 130, or user vehicle 140 via network 110. In other embodiments, server(s) 125 represents a server computing system utilizing multiple computers as a server system, such as a cloud computing environment. In yet other embodiments, server(s) 125 represents a computing system utilizing clustered computers and components (e.g., database server computers, application server computers, etc.) that act as a single pool of seamless resources when accessed within distributed data processing environment 100. Server(s) 125 may include components as described in further detail in FIG. 4.

Contactless shopping program 132 may be a mobile application software program, or a "mobile app" or an "app", designed to run on a smart phone, a tablet computer, or other mobile devices. Contactless shopping program 132 may operate within a web browser, or other compatible software used for shopping displayed via user device 120, mobility device 130, or user vehicle 140. Contactless shopping program 132 may be any native application or pre-installed software on a mobile computing device, such as user device 120. A native application can be, for example, a web browser, email client, mapping program, or an app for purchasing music, other media, or additional apps. Contactless shopping program 132 may be a software application or a web application that can run in a mobile web browser.

Figure 2:
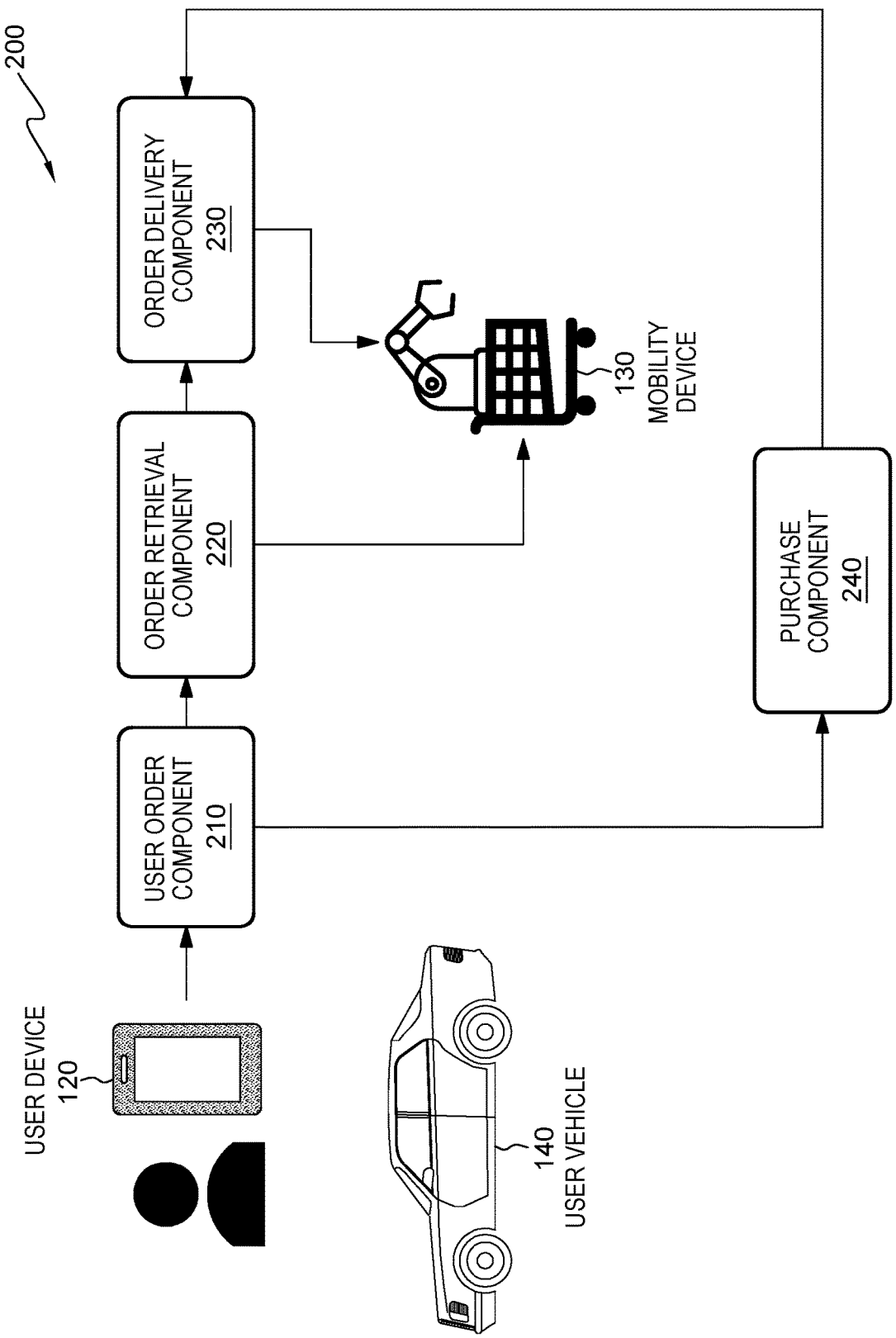
FIG. 2 depicts a block diagram of a system for contactless remote shopping assistance, in accordance with an embodiment of the present invention.

FIG. 2 depicts a block diagram of a system 200 for contactless remote shopping assistance, in accordance with an embodiment of the present invention.

In an embodiment, system 200 may include user device 120 configured to receive order data corresponding to an order placed by a user. User device 120 may also be configured to transmit the order data to a retail entity to carry out the order request submitted by the user.

In an embodiment, system 200 may include user order component 210 configured for receiving and processing the order data. In some embodiments, user order component 210 may be configured to determine an order for one or more items to be retrieved from a parking lot of the retail entity proximate to a retail entity location. User order component 210 may also be configured for transmitting the order data to the retail entity to begin the process of fulfilling the order by retrieving items specified in the order.

In an embodiment, system 200 may include order retrieval component 220 configured to assign the order to mobility device 130 stationed in, near, or at a shopping facility of the retail entity. Further, order retrieval component 220 may be configured to transmit order retrieval instructions to mobility device 130 causing mobility device 130 to navigate the retail entity to secure the items described in the order.

In an embodiment, system 200 may include order delivery component 230 configured to receive an indication that mobility device 130 has secured the items. Further, order delivery component 230 configured to transmit order delivery instructions to mobility device 130 causing mobility device to navigate to a designated delivery location (e.g., parking lot, curbside pick-up) to transfer the items to user vehicle 140 associated with a user of user device 120.

In an embodiment, system 200 may be configured to receive first order data from user device 120 and determine the details of an order including one or more items available at a retail entity. Details of the order may include a retail entity, a retail entity location, payment information, and delivery information including vehicle identification information.

In an embodiment, system 200 may be configured to transmit the order data to the retail entity and assign the order to mobility device 130 stationed at the retail entity. Further, system 200 may include order retrieval component 220 configured to transmit order retrieval instructions to mobility device 130 causing mobility device 130 to navigate the retail entity to secure the one or more items. Furthermore, responsive to transmitting the order retrieval instructions to mobile device 130, system 200 may be configured to transmit livestream video data to user device 120 during the time in which mobility device 130 is navigating the retail entity and fulfilling the order.

In an embodiment, system 200 may be configured to receive second order data from user device 120, wherein the second order data may correspond to a user request to modify the one or more items. For example, user device 120 may receive user inputs corresponding to the user making a change (e.g., substitute item, return item, pickup new item) to one or more items in the order. Further, system 200 may be configured to transmit the second order data to mobility device 130 to update the order retrieval instructions. The second order data may be transmitted to user device 120 during the time in which mobility device 130 is navigating the retail entity and fulfilling the order.

In an embodiment, the user request may include one or more of image data, user annotations of images represented in the image data, wherein the image data may correspond to images captured from the livestream video displayed on user device 120. For example, while the livestream video of mobility device 130 retrieving items from retail entity is being shown on user device 120, user device 120 may be configured to receive user inputs to capture a screenshot or a frame of the livestream video. Further, user device 120 may be configured to receive user inputs to annotate the captured screenshots or captured frames with notes or instructions of how to modify the items in the order. For example, retail entity may be a grocery store and mobility device 130 may be retrieving an apple from the produce aisle and transmitting livestream video of the apple retrieval.

In an embodiment, during the apple retrieval livestream, user device 120 may be configured to receive user inputs corresponding to a user request to substitute a selected apple with another apple, or to return the selected item. The user request may include an audio user request, a text input user request, or an annotated image user request indicating which apple to substitute with the selected apple. Order retrieval component 220 may be configured to receive the user request, process the user request to determine the intent of the user request, and update the order retrieval instructions to include the user request as second order data.

In an embodiment, system 200 may be configured to transmit instructions to mobility device 130 causing mobility device 130 to capture images of user vehicle 140 intended to receive delivery of the items from mobility device 130. Further, system 200 may be configured to receive vehicle image data corresponding to the captured images of user vehicle 140, wherein the captured images may include one or more of license plate images and vehicle images. Furthermore, system 200 may be configured to determine that the vehicle intended to receive delivery of the items is associated with the user of user device 120 based on one or more of the vehicle image data, the vehicle identification information, and a user confirmation. Even further, system 200 may be configured to transmit a transfer items command to mobility device 130 causing mobility device 130 to transfer the items from a cart of mobility device 130 to a compartment of user vehicle 140. In an embodiment, the transfer items command may only be issued to mobility device 130 upon receiving one or more of a user confirmation and payment confirmation.

In an embodiment, system 200 may include purchase component 240 configured to facilitate payment for the items in the order to be delivered to user vehicle 140. For example, purchase component 240 may be configured to facilitate acceptance of any form of payment (e.g., credit card, cash, cryptocurrency) for the items included in the order placed on user device 120.

Figure 3:
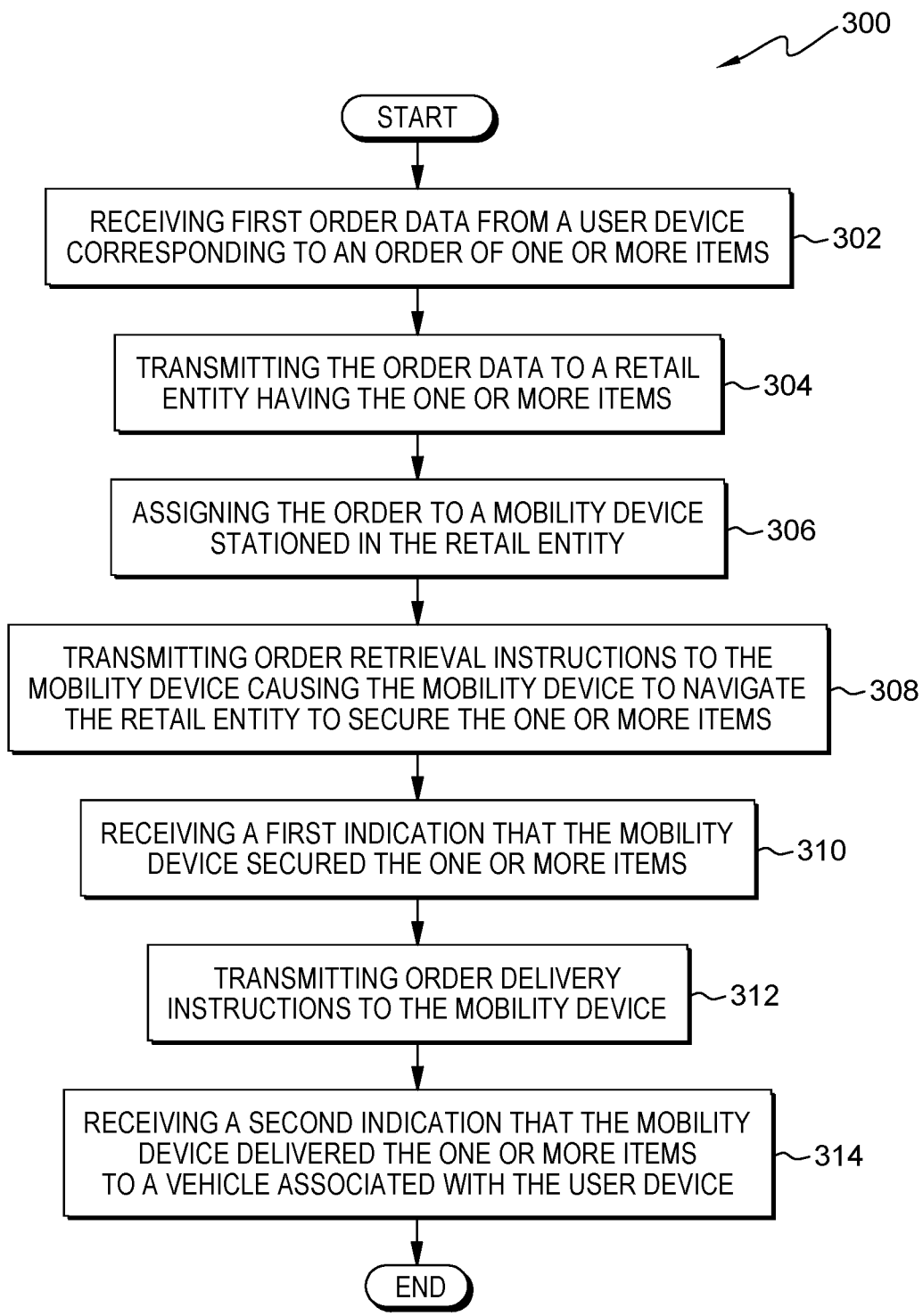
FIG. 3 is a flowchart depicting operational steps of a computer-implemented method for contactless remote shopping assistance, on a server computer within the distributed data processing environment of FIG. 1, in accordance with an embodiment of the present invention.

FIG. 3 is a flowchart depicting operational steps of computer-implemented method 300 for contactless remote shopping assistance, on a server computer within the distributed data processing environment of FIG. 1, in accordance with an embodiment of the present invention.

In an embodiment, computer-implemented method 300 for contactless remote shopping assistance may include one or more processors configured to execute contactless shopping program 132.

In an embodiment, computer-implemented method 300 may include one or more processors configured for receiving 302 first order data from a user device corresponding to an order of one or more items. The one or more items may correspond to items to be retrieved from a parking lot of a retail entity proximate to a retail entity location.

In an embodiment, computer-implemented method 300 may be configured for determining order delivery instructions based on the order data. For example, order data may include one or more of order information corresponding to the order, retail entity information corresponding to the retail entity, payment information, and delivery information comprising vehicle identification information, delivery location information and delivery time. Vehicle identification information may include one or more of year, make, model, color, style, license plate number, license plate state registration, vehicle location. For example, a user vehicle may include vehicle identification information such as a black (color) 2022 (year) Galactic (make) Star (model) with Massachusetts registration 1EV4U (state registration). Thus, determining delivery instructions may include identifying the vehicle identification information, delivery location information (e.g., retail entity parking lot space no. 1), and delivery time (e.g., 1300 hours) in the order data, compiling the order delivery instructions into a data packet, and transmitting the order delivery instructions to mobility device 130 for execution.

In an embodiment, computer-implemented method 300 may include one or more processors configured for transmitting 304 the order data to a retail entity having the one or more items.

In an embodiment, computer-implemented method 300 may include one or more processors configured for determining the retail entity based on the order data. For example, the order data may include retail entity information corresponding to a retail shopping store having a geographical location (e.g., address of the retail shopping store).

In an embodiment, computer-implemented method 300 may include one or more processors configured for assigning 306 the order to a mobility device stationed at the retail entity. For example, the mobility device may be stationed at a mobility device bay location within proximity of, or inside, the retail entity store or warehouse. While stationed, the mobility device may be connected to one or more of, a power source to receive a charge, or a network to communicate with the retail entity servers. Once the order is received at the retail entity, the mobility device may be configured to receive instructions from the network to carry out the order fulfillment and the order will be assigned to that mobility device.

In another embodiment, more than one mobility device may be configured to receive instructions from the network to carry out at least a portion of the order. For example, a first mobility device may receive instructions to carry out a first portion of the order corresponding to items located in a first section of the retail entity store or warehouse and a second mobility device may receive instructions to carry out a second portion of the order corresponding to items located in a second section of the retail entity store or warehouse. Further, computer-implemented method 300 may be configured to consolidate the order items into one of either of the mobility devices for delivery, or deliver the items separately, to a vehicle associated with a user device.

In an embodiment, computer-implemented method 300 may include one or more processors configured for transmitting 308 order retrieval instructions to the mobility device causing the mobility device to navigate the retail entity to secure the one or more items.

In an embodiment, responsive to transmitting 308 order retrieval instructions to the mobile device, computer-implemented method 300 may include one or more processors configured for transmitting livestream video data to the user device.

In an embodiment, computer-implemented method 300 may include one or more processors configured for receiving 310 a first indication that the mobility device secured the one or more items.

In an embodiment, computer-implemented method 300 may include one or more processors configured for transmitting 312 order delivery instructions to the mobility device.

In an embodiment, computer-implemented method 300 may include one or more processors configured for receiving 314 a second indication that the mobility device delivered the one or more items to a vehicle associated with the user device.

In an embodiment, computer-implemented method 300 may include one or more processors configured for receiving second order data from the user device, wherein the second order data may correspond to a user request to modify the one or more items.

In an embodiment, computer-implemented method 300 may include one or more processors configured for transmitting the second order data to the mobility device to update the order retrieval instructions.

In an embodiment, the user request may include one or more of image data and corresponding user annotations, wherein the image data may be captured from the livestream video data.

In an embodiment, computer-implemented method 300 may include one or more processors configured for receiving vehicle image data comprising one or more of license plate images and vehicle images.

In an embodiment, computer-implemented method 300 may include one or more processors configured for determining that the vehicle is associated with the user of the user device based on one or more of the vehicle image data, the vehicle identification information, and a user confirmation.

In an embodiment, computer-implemented method 300 may include one or more processors configured for transmitting a transfer items command to the mobility device.

In an embodiment, mobility device 130 may be a robotic smart shopping cart comprising a robotic arm for selecting items from the shopping facility. For example, the mobility device may include an autonomous shopping cart configured to self-drive and follow, lead, or navigate around a shopping area, as known to a person of ordinary skill in the art. Mobility device 130 may include a motor, powertrain, drivetrain, and wheels to traverse a surface. Further, mobility device 130 may include one or more sensors configured to detect images, movement, sound, light, and other ambient elements within proximity of mobility device 130. Mobility device 130 may also include components identical to user device 120 configured to transmit and receive data between network 110 and other components in communication with mobility device 130. Mobility device 130 may also include a robotic arm comprising metal segments joined by joints configured to be controlled by the one or more processors to perform tasks to retrieve, return, and/or deliver items to the user.

In an embodiment, computer-implemented method 300 may include one or more processors configured for transmitting instructions to mobility device 130 causing mobility device 130 to navigate the shopping facility. For example, mobility device 130 may include sensors configured to detect surrounding surfaces and traverse the shopping facility based on a map of the shopping facility and information corresponding to a location (e.g., aisle, bay, shelf) of an item. Further, mobility device 130 may be configured to identify a user proximate to mobility device 130 and follow the user's movement to move with the user as the user moves throughout the shopping facility.

In some embodiments, mobility device 130 may be configured to receive instructions or commands from user device 120 or another device controlled by an agent of the retail entity to perform various actions. For example, the user or agent may send instructions from user device 120, or another device associated with the retail entity agent, to mobility device 130 to stop, to follow, to wait for a specific amount of time, to presume following, to retrieve an item, or put back an item, or to perform any other task that a human shopper should be able to perform.

In an embodiment, the computer-implemented method for providing virtual contactless shopping assistance to a user may include one or more processors configured for receiving a user instruction to capture an image or begin a livestream video causing mobility device 130 to capture images or video. In an embodiment, while mobility device 130 is navigating the shopping facility, mobility device 130 may be configured to detect or receive a user request (e.g., voice command, typed command, data instructions) to perform an action in real-time.

In an embodiment, the user request may include a command or instruction for mobility device 130 to perform an action (e.g., take a picture, retrieve an item). In an example embodiment, mobility device 130 may be navigating a shopping facility and transmitting livestream video data to user device 120, wherein user device 120 is configured to capture a portion (e.g., screenshot, video clip) of the livestream video to assist user in identifying an item as the subject for a user request. For example, while viewing the livestream video on user device 120, the user may observe mobility device 130 retrieving an item that the user does not want anymore. Therefore, the user may submit a user request, via user device 120, to update the order by performing an action. The action may include one or more of returning the item, selecting another item, selecting an item that meets certain item criteria (e.g., price, weight, color, expiration date, on sale, generic, name brand), capturing an image of the item, inspecting the item, etc.

In an embodiment, computer-implemented method 300 may include one or more processors configured for identifying a bar code in the image. For example, once the image is captured, the one or more processors may be configured to process the image and determine if a bar code is in the image and identifying the bar code in the image.

In an embodiment, computer-implemented method 300 may include one or more processors configured for determining an item based on the bar code. For example, an item may be determined based on the bar code by querying a database of bar codes and items and identifying the item that is associated with or corresponds to the bar code.

In an embodiment, computer-implemented method 300 may include one or more processors configured for transmitting an action instruction to mobility device 130 to retrieve the item and secure the item. For example, once the item quantity is determined, the one or more processors may be configured to automatically generate and transmit an action instruction to mobility device 130 to retrieve the item (in the quantity specified in the order) and secure the item in a cart of mobility device 130. Alternatively, the item may be secured by mobility device 130 providing it directly to the user if the user is within proximity of mobility device 130.

In an embodiment, computer-implemented method 300 may include one or more processors configured for generating an invoice based at least on the item, the item quantity, and the order data. For example, once mobility device 130 has retrieved and secured the item, the one or more processors may be configured to generate an invoice comprising the item description, quantity, price, and other pertinent information normally displayed on an invoice. The invoice may be displayed on a user interface of mobility device 130, or displayed on user interface 122 of user device 120.

In an embodiment, computer-implemented method 300 may include one or more processors configured for providing the invoice to the user via user device 130. For example, user device 120 and/or mobility device 130 may be configured to present, display, or provide the invoice to the user via a user interface (e.g., display monitor, or other communication medium) or a peripheral printer.

In an embodiment, computer-implemented method 300 may include one or more processors configured for processing payment information received from the user. For example, one or more of user device 120, or mobility device 130 may include a chip reader or payment processing software to receive user authorization to process user payment information for the invoice presented to the user.

In an embodiment, computer-implemented method 300 may include one or more processors configured for delivering the items in mobility device 130 to a delivery station (e.g., designated location in shopping facility, parking lot). For example, upon receiving an indication that mobility device 130 has completed the task (e.g., contactless shopping), the one or more processors may be configured to send instructions to mobility device 130 to transport the items to the delivery station and provide the items, or make the items available, to the user upon receiving confirmation that the payment information was received from the user and the invoice was satisfied. Mobility device 130 may be configured to provide the items to the user by removing the items from the cart and placing the items into user vehicle 140 confirmed to be associated with the user of user device 120.

The present invention may contain various accessible data sources, such as databases, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Contactless shopping program 132 enables the authorized and secure processing of personal data. Contactless shopping program 132 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Contactless shopping program 132 provides information regarding personal data and the nature (e.g., type, scope, purpose, duration, etc.) of the processing. Contactless shopping program 132 provides the user with copies of stored personal data. Contactless shopping program 132 allows the correction or completion of incorrect or incomplete personal data. Contactless shopping program 132 allows the immediate deletion of personal data.

Figure 4:
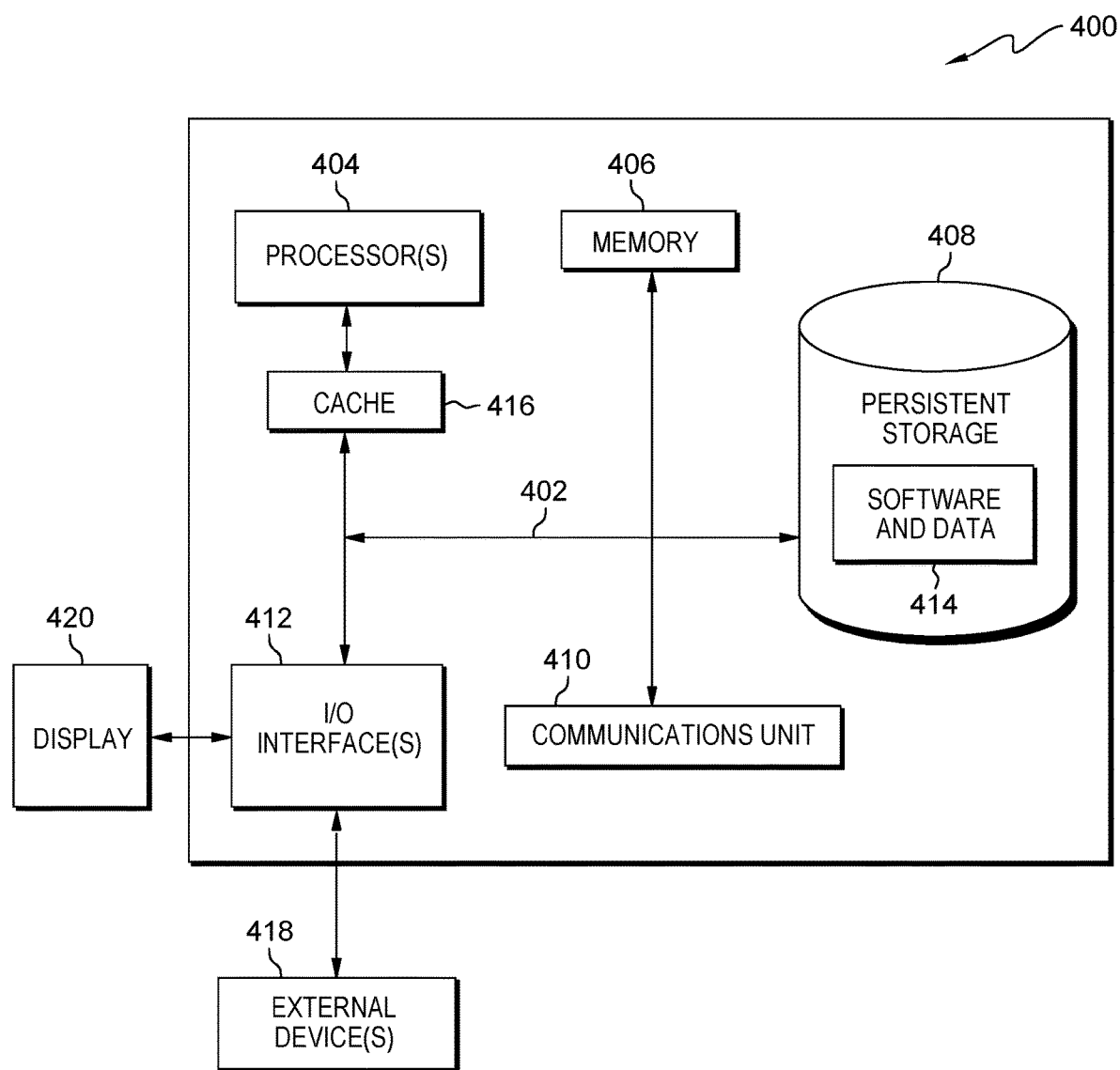
FIG. 4 depicts a block diagram of components of the server computer executing the shopping assist program within the distributed data processing environment of FIG. 1, in accordance with an embodiment of the present invention.

FIG. 4 depicts a block diagram 400 of components of server computing device (e.g., user device 120) or mobility device 130 within data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

User device 120 or mobility device 130 can include processor(s) 402, memory 404, cache 406, persistent storage 410, input/output (I/O) interface(s) 412, communications unit 414, and communications fabric 408. Communications fabric 408 provides communications between memory 404, cache 406, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses.

Memory 404 and persistent storage 410 are computer readable storage media. In this embodiment, memory 404 includes random access memory (RAM). In general, memory 404 can include any suitable volatile or non-volatile computer readable storage media. Cache 406 is a fast memory that enhances the performance of processor(s) 402 by holding recently accessed data, and data near recently accessed data, from memory 404.

Program instructions and data used to practice embodiments of the present invention, such as contactless shopping program 132, can be stored in persistent storage 410 for execution and/or access by one or more of the respective processor(s) 402 of user device 120 via cache 406. In this embodiment, persistent storage 410 includes a magnetic hard disk drive. Alternatively, or in addition to a magnetic hard disk drive, persistent storage 410 can include a solid-state hard drive, a semiconductor storage device, a read-only memory (ROM), an erasable programmable read-only memory (EPROM), a flash memory, or any other computer readable storage media or device that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer readable storage medium that is also part of persistent storage 410.

Communications unit 414, in these examples, provides for communications with other data processing systems or devices, including resources of user device 120 or mobility device 130. In these examples, communications unit 414 includes one or more network interface cards. Communications unit 414 may provide communications through the use of either or both physical and wireless communications links. Software and data used to practice embodiments of the present invention, for example, contactless shopping program 132, may be downloaded to persistent storage 410 through communications unit 414.

I/O interface(s) 412 allows for input and output of data with other devices that may be connected to user device 120 or mobility device 130. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 410 via I/O interface(s) 412. I/O interface(s) 412 also connect to a display 418.

Display 418 provides a mechanism to display data to a user and may be, for example, a computer monitor or an incorporated display screen, such as is used, for example, in tablet computers and smart phones.

Although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
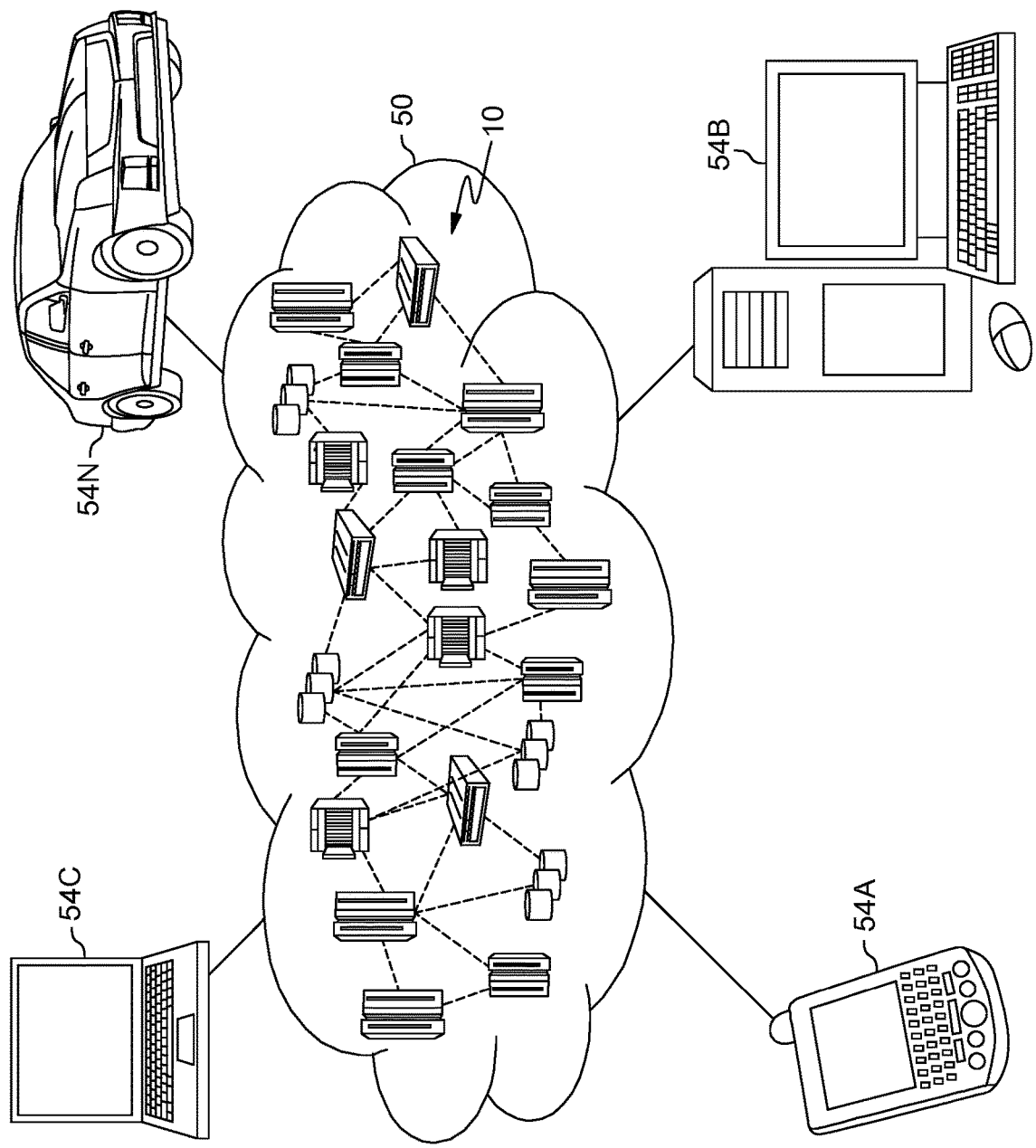
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser). In various embodiments, cloud computing node 10 is a computer system including components and capabilities as discussed with respect to FIG. 4.

Figure 6:
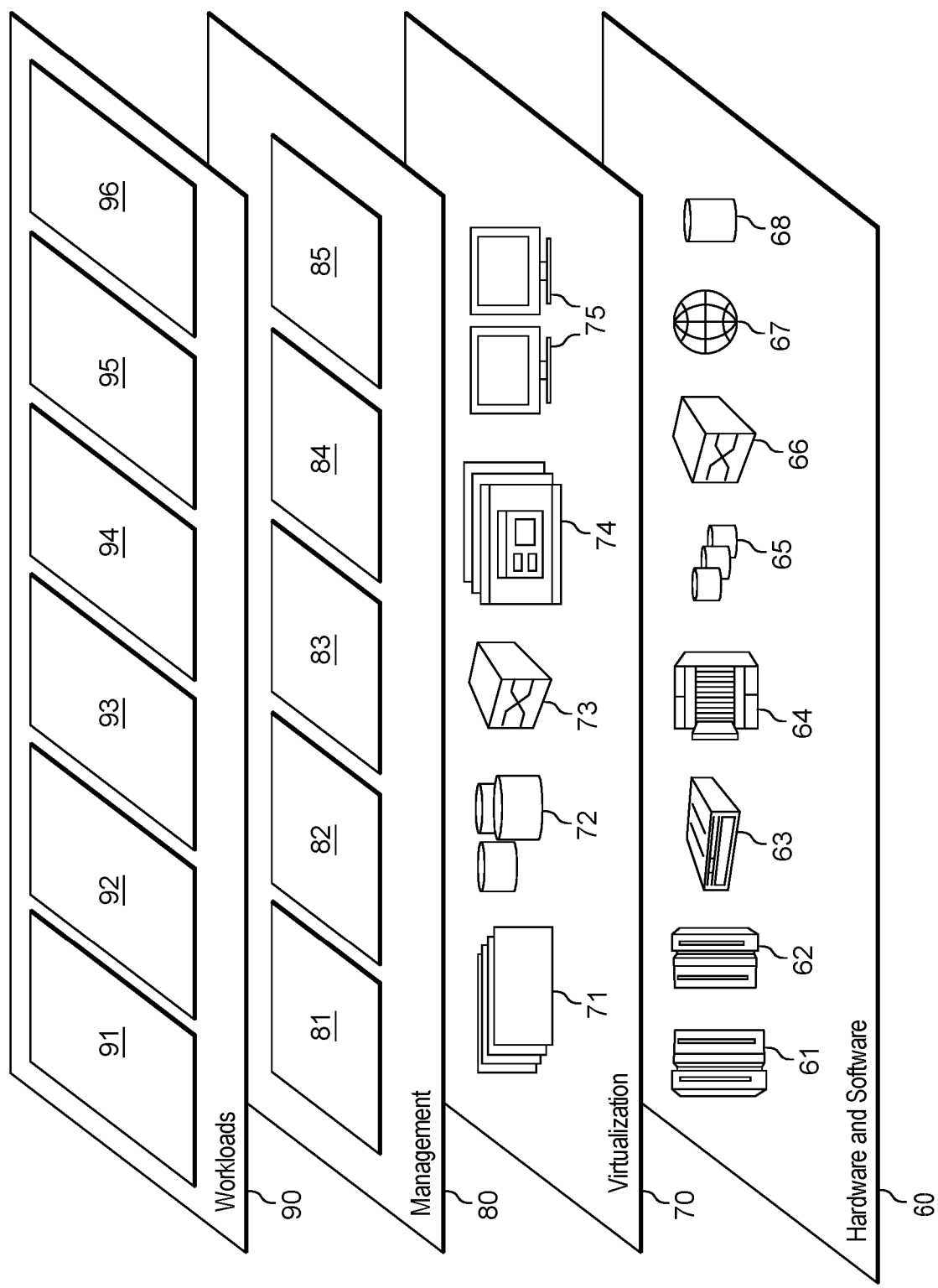
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and shopping assist program 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a computer system, a computer-implemented method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, first order data from a user device corresponding to an order of one or more items;
   transmitting, by one or more processors, the first order data to a retail entity having the one or more items;
   assigning, by one or more processors, the order to a mobility device stationed at the retail entity;
   transmitting, by one or more processors, order retrieval instructions to the mobility device causing the mobility device to navigate the retail entity to secure the one or more items;
   receiving, by one or more processors, a first indication that the mobility device secured the one or more items;
   transmitting, by one or more processors, order delivery instructions to the mobility device; and
   receiving, by one or more processors, a second indication that the mobility device delivered the one or more items to a vehicle associated with the user device.

2. The computer-implemented method of claim 1, further comprising:
   responsive to transmitting the order retrieval instructions to the mobility device, transmitting, by one or more processors, livestream video data to the user device during a time in which the mobility device is navigating the retail entity and fulfilling the order, wherein the livestream video data comprises an image of an item of the one or more items of the order;
   receiving a user request to modify the first order forming a second order, wherein the modification of the first order comprises substituting the item or returning the item; and
   updating the order retrieval instructions to include the user request as second order data.

3. The computer-implemented method of claim 1, wherein the mobility device is a robotic smart shopping cart comprising a robotic arm for picking up and putting down the one or more items.

4. The computer-implemented method of claim 1, further comprising:
   receiving, by one or more processors, second order data from the user device, the second order data corresponding to a user request to modify the one or more items; and
   transmitting, by one or more processors, the second order data to the mobility device to update the order retrieval instructions.

5. The computer-implemented method of claim 4, wherein the user request comprises one or more of image data and corresponding user annotations, and the image data is captured from the livestream video data.

6. The computer-implemented method of claim 1, wherein the first order data comprises one or more of order information corresponding to the order, retail entity information corresponding to the retail entity, payment information, and delivery information comprising vehicle identification information.

7. The computer-implemented method of claim 6, further comprising:
   receiving, by one or more processors, vehicle image data comprising one or more of license plate images and vehicle images;
   determining, by one or more processors, that the vehicle is associated with the user of the user device based on one or more of the vehicle image data, the vehicle identification information, and a user confirmation; and
   transmitting, by one or more processors, a transfer items command to the mobility device.

8. A computer program product, the computer program product comprising:
   one or more computer readable storage media and program instructions collectively stored on the one or more computer readable storage media, the stored program instructions comprising program instructions to perform a computer-implemented method comprising:
   program instructions to receive first order data from a user device corresponding to an order of one or more items to be retrieved from a parking lot of a retail entity proximate to a retail entity location;
   program instructions to transmit the first order data to the retail entity;
   program instructions to assign the order to a mobility device stationed at the retail entity;
   program instructions to transmit order retrieval instructions to the mobility device causing the mobility device to navigate the retail entity to secure the one or more items;
   program instructions to receive a first indication that the mobility device secured the one or more items;
   program instructions to transmit order delivery instructions to the mobility device; and
   program instructions to receive a second indication that the mobility device transported the one or more items to the parking lot and placed the one or more items in a vehicle associated with a user of the user device.

9. The computer program product of claim 8, further comprising:
   program instructions to receive second order data from the user device, the second order data corresponding to a user request to modify the one or more items; and
   program instructions to transmit the second order data to the mobility device to update the order retrieval instructions.

10. The computer program product of claim 8, wherein the mobility device is a robotic smart shopping cart comprising a robotic arm for picking up and putting down the one or more items.

11. The computer program product of claim 8, further comprising:
    responsive to the program instructions to transmit the order retrieval instructions to the mobile device, program instructions to transmit livestream video data to the user device during a time in which the mobility device is navigating the retail entity and fulfilling the order, wherein the livestream video data comprises an image of an item of the one or more items of the order:
    program instructions to receive a user request to modify the first order forming a second order, wherein the modification of the first order comprises substituting the item or returning the item; and
    program instructions to update the order retrieval instructions to include the user request as second order data.

12. The computer program product of claim 11, wherein the user request comprises one or more of image data and corresponding user annotations, the image data captured from the livestream video data.

13. The computer program product of claim 8, wherein the first order data comprises one or more of order information corresponding to the order, retail entity information corresponding to the retail entity, payment information, and delivery information comprising vehicle identification information.

14. The computer program product of claim 13, further comprising:
program instructions to receive vehicle image data comprising one or more of license plate images and vehicle images;
program instructions to determine that the vehicle is associated with the user of the user device based on one or more of the vehicle image data, the vehicle identification information, and a user confirmation; and
program instructions to transmit a transfer items command to the mobility device.

15. A computer system, the computer system comprising:
one or more computer processors;
one or more computer readable storage media;
program instructions collectively stored on the one or more computer readable storage media for execution by at least one of the one or more computer processors, the stored program instructions comprising program instructions to perform a computer-implemented method comprising:
program instructions to receive first order data from a user device corresponding to an order of one or more items to be retrieved from a parking lot of a retail entity proximate to a retail entity location;
program instructions to transmit the first order data to the retail entity; program instructions to assign the order to a mobility device stationed at the retail entity;
program instructions to transmit order retrieval instructions to the mobility device causing the mobility device to navigate the retail entity to secure the one or more items;
program instructions to receive a first indication that the mobility device secured the one or more items;
program instructions to transmit order delivery instructions to the mobility device; and
program instructions to receive a second indication that the mobility device transported the one or more items to the parking lot and placed the one or more items in a vehicle associated with a user of the user device.

16. The computer system of claim 15, further comprising:
program instructions to receive second order data from the user device, the second order data corresponding to a user request to modify the one or more items; and
program instructions to transmit the second order data to the mobility device to update the order retrieval instructions.

17. The computer system of claim 15, wherein the mobility device is a robotic smart shopping cart comprising a robotic arm for picking up and putting down the one or more items, and
responsive to the program instructions to transmit the order retrieval instructions to the mobile device, program instructions to transmit livestream video data to the user device during a time in which the mobility device is navigating the retail entity and fulfilling the order, wherein the livestream video data comprises an image of an item of the one or more items of the order;
program instructions to receive a user request to modify the first order forming a second order, wherein the modification of the first order comprises substituting the item or returning the item; and
program instructions to update the order retrieval instructions to include the user request as second order data.

18. The computer system of claim 17, wherein the user request comprises one or more of image data and corresponding user annotations, the image data captured from the livestream video data.

19. The computer system of claim 15, wherein the first order data comprises one or more of order information corresponding to the order, retail entity information corresponding to the retail entity, payment information, and delivery information comprising vehicle identification information.

20. The computer system of claim 19, further comprising:
program instructions to receive vehicle image data comprising one or more of license plate images and vehicle images;
program instructions to determine that the vehicle is associated with the user of the user device based on one or more of the vehicle image data, the vehicle identification information, and a user confirmation; and
program instructions to transmit a transfer items command to the mobility device.

* * * * *